(No Model.) 5 Sheets—Sheet 1.

J. WHITE.
BURGLAR PROOF SAFE.

No. 287,787. Patented Oct. 30, 1883.

Witnesses:
H. N. Low
J. S. Barker

Inventor
James White
by Doubleday & Bliss
attys (No Model.)
5 Sheets—Sheet 2.

J. WHITE.
BURGLAR PROOF SAFE.

No. 287,787. Patented Oct. 30, 1883.

Witnesses:
N. N. Low
J. S. Barker.

Inventor:
James White
by Doubleday & Bliss
attys.

(No Model.) 5 Sheets—Sheet 3.

J. WHITE.
BURGLAR PROOF SAFE.

No. 287,787. Patented Oct. 30, 1883.

Witnesses:
H. N. Low
J. S. Barker

Inventor:
James White
by Doubleday & Bliss
attys.

(No Model.)  
J. WHITE.  
BURGLAR PROOF SAFE.  
No. 287,787. Patented Oct. 30, 1883.

Witnesses:  
N. N. Low  
J. S. Barker

Inventor:  
James White  
by Doubleday & Bliss  
attys.

UNITED STATES PATENT OFFICE.

JAMES WHITE, OF CANTON, OHIO.

BURGLAR-PROOF SAFE.

SPECIFICATION forming part of Letters Patent No. 287,787, dated October 30, 1883.

Application filed December 29, 1882. (No model.)

*To all whom it may concern:*

Be it known that I, JAMES WHITE, a citizen of the United States, residing at Canton, in the county of Stark and State of Ohio, have invented certain new and useful Improvements in Burglar-Safes, of which the following is a specification, reference being had therein to the accompanying drawings.

Figure 5:
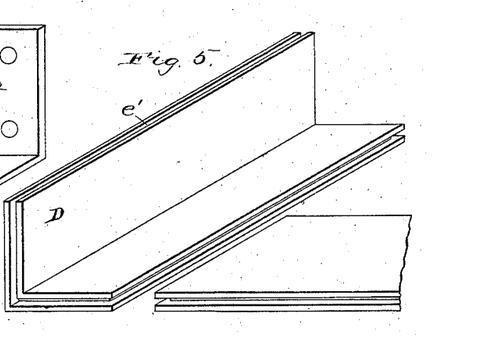
Figures 6, 7:
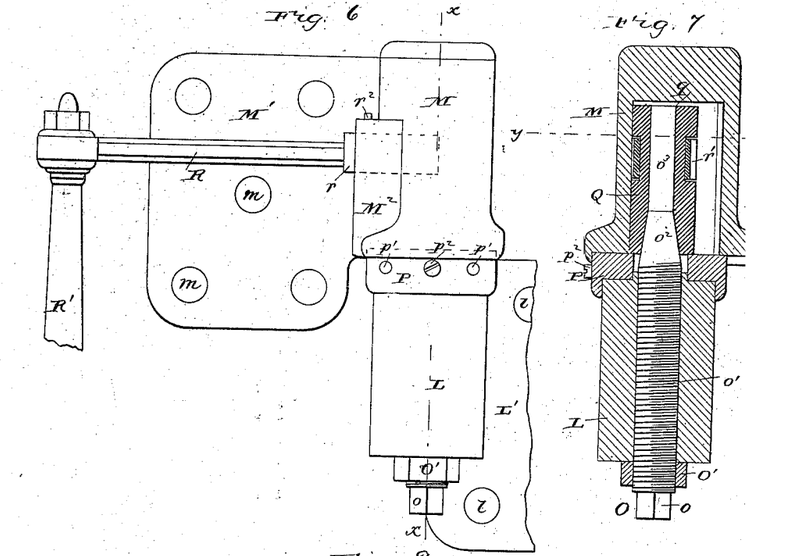
Fig. 6 is a front view of one of the hinges of the door.
Fig. 7 is a vertical section on the line $x\ x$ of Fig. 6.
Figures 8, 9, 10, 11, 12:
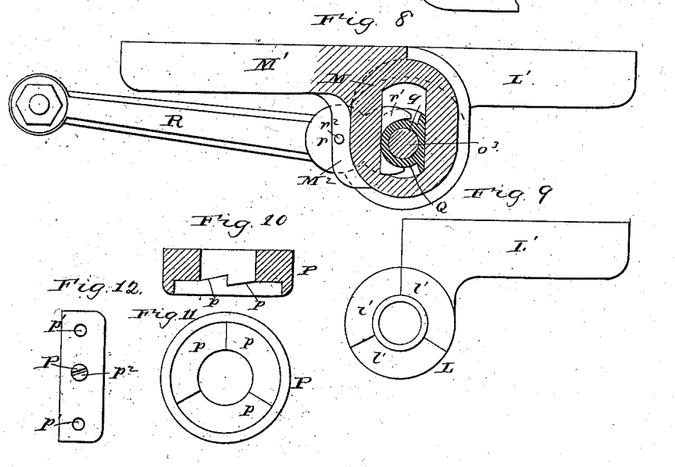
Fig. 8 is a horizontal section on line $y\ y$, Fig. 7.
Fig. 9 is a top view of the lower part of the hinge detached.
Fig. 10 is a cross-section of the adjusting-ring.
Fig. 11 is a bottom view of the same.
Fig. 12 is a side view of it.

The main frame-work of the safe is constructed of the front angle-piece, $A\ A'\ A^2\ A^3$, the rear angle-piece, $B\ B'\ B^2\ B^3$, the bottom joining-pieces, C, and the corresponding top pieces, D D. In Fig. 5 is shown detached one of the top corner angle-pieces, D. The bottom connecting corner-pieces, C, are substantially similar, and the front and back angle-frames, $A\ A'\ A^2\ A^3$ and $B\ B'\ B^2\ B^3$, are built up of corresponding angle-plates welded together to form the two square frames shown. These angle-pieces are rolled from sheet metal, the sheets being of a composite character—that is to say, consisting of three or more sheets of iron, and two or more sheets of steel inclosed between the sheets or laminæ of iron. The outside casing is formed of plates of metal composed of sheets or laminæ of iron or steel of substantially the same character as those used for the corner angle-pieces.

The side panel-pieces are represented by E, and the rear or back pieces by E'. For safes of the ordinary larger size it is impracticable to make sheets of the composite character described wide enough to extend entirely across the side or face of the safe; hence it has been necessary, in manufacturing safes of this kind, to join at the edges two or more sheets, as shown in the drawings. The method of fastening with which I am acquainted that has been common heretofore is illustrated in Fig. 19—that is to say, the sheets have been rabbeted to provide overlapping tongues $e$, the tongue of each plate corresponding to the rabbet in the opposing adjacent plate. Screws have then been inserted from the inside in such manner as to more or less bind together the inner plates and the outer. Experience, however, has shown that many disadvantages and difficulties are incident to this method of joining the panel-plates to each other and to the corner frame-pieces. To provide a close fitting of the tongues and rabbets, it has been necessary to subject the three faces produced upon each edge of the plates to a planing operation. The planing of such faces is very difficult, owing to the presence of the steel plates or laminæ. When the plates are tempered, they are apt to spring more or less, and in order to make a perfect joint where the rabbeted portions join, only one part of the rabbet can be ground, leaving the inner part to come in contact with the next plate, which has to be ground off to make a good joint. Moreover, even when a joint comparatively perfect is produced, it has been found that it can be so attacked by burglars' tools as to be practically but a slight guard against tearing the plates apart where the tongues overlap.

Figure 1:
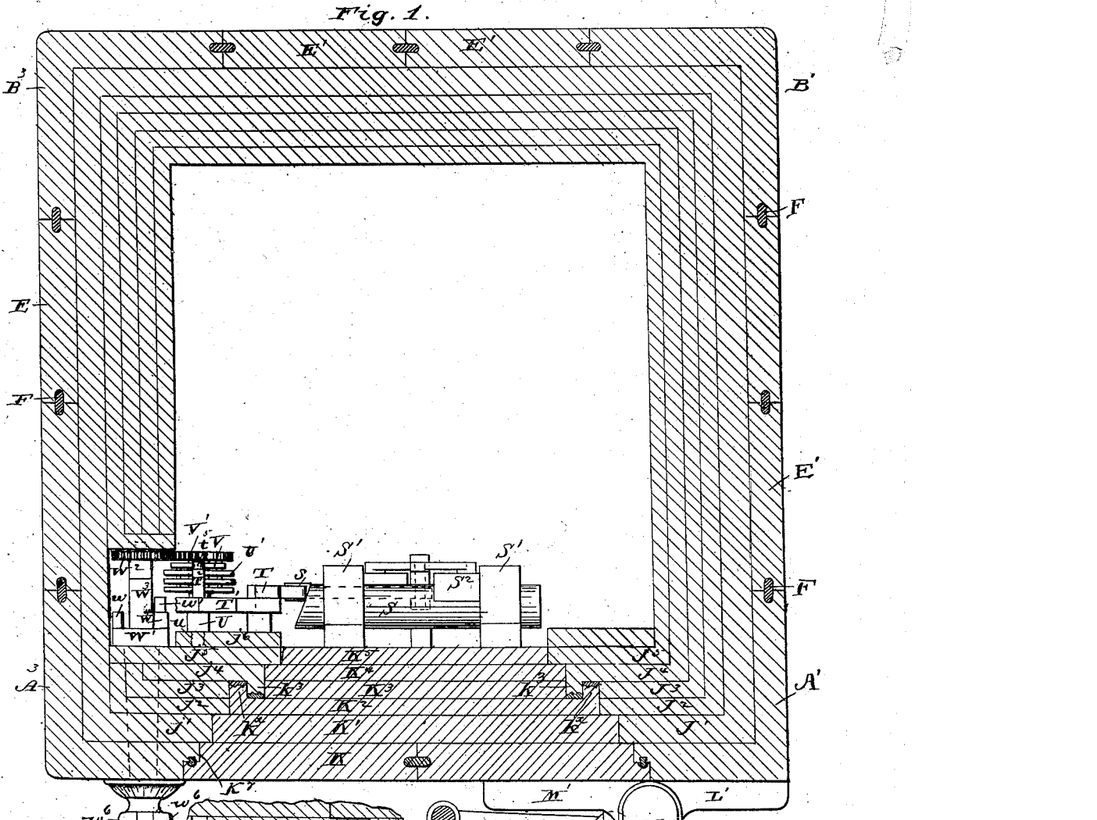
Figure 1 is a horizontal section of a safe embodying my improvements.

To obviate the difficulties of construction experienced in following the above-described method of joining the plates together, and to provide a superior safeguard against the splitting of the plates apart, I have devised the following means for joining together the plates. Referring to Fig. 1, it will be seen that the edge of each plate is square entirely across the edge, except at the central point, where a groove is provided, to be described. By having the plates thus without tongues or projections upon one side extending farther out than the other, I can produce the requisite smoothness and planeness by a simple grinding action, and such action is much simpler and cheaper than that of planing, as is well known to those acquainted with the manipulating of such materials. Along the central longitudinal line of each plate there is formed a groove, $e'$, which can be produced mainly when the plates are being rolled, though I prefer, after rolling, to plane out the grooves slightly, so as to make the walls and bottom of the groove perfectly true and smooth. When "five-ply" sheets— that is to say, sheets having a central layer or lamina of iron, and also outer layers of the same material, with steel ones between—are employed, the grooves are formed in the softer iron layer, and this can be planed with much less difficulty than can steel layers.

F represents a dowel-strip or joining-tongue, preferably made of steel, of such width as to fit tightly within the grooves $e'\ e'$ in the opposing edges of the adjacent layers. After they have been joined by means of this strip or bar, it is practically impossible to get wedges or similar tools far enough into the joint between the plates to have them (said tools) utilized in splitting the plates apart or forcing them loose from the plates behind. By examining Fig. 2 of the drawings it will be seen that there is upon the outer side of the groove and the dowel or tongue a layer of steel, $m^3$, and upon the inner side another layer, $m^4$. The outer layer, $m^3$, of the steel serves to prevent the cutting away of the metal upon the outside of the groove, so that it is practically impossible to get an aperture formed for the insertion of a wedge past the edge of the dowel or tongue, and the steel layer $m^4$ upon the inside of the groove prevents the metal from being bent or twisted, so as to permit the plates to be sprung apart or pulled outward beyond the dowel or tongue. I have represented by $m^5$ that portion of the outer plate which lies outside of the groove and tongue, and which, as above said, is protected by the steel layer $m^3$ from being cut, and have represented by $m^6$ that portion of the metal inside of the groove and the tongue, which is prevented from being twisted or bent by the steel layer $m^4$. The grooves $e'\ e'$ may be of any depth desired, and the doweling-piece or joining-strip F may be of corresponding width. The angle-plates at the front, rear, top, and bottom of the safe are grooved, and provided with doweling or joining pieces of a similar character to that described.

Figure 4:
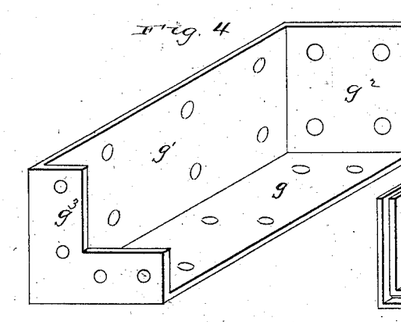
Figs. 4 and 5 are perspective views of detail parts.

In setting up a safe of the character shown, the side panels, E E, may be driven into place upon the doweling or joining strips at the edge of the front angle-piece, and after they have been thus put together the rear angle-frame can be joined to the other parts, as will be readily understood. After these parts of the safe have been secured together, I insert solid welded angle parts made of plates of about an inch in thickness, with the ends welded solidly together to form tying-angles or cross-braces, these being preferably of about the form shown in Fig. 4—that is to say, having a bottom piece, $g$, a side piece, $g'$, a rear piece, $g^2$, and a front piece, $g^3$, the latter being cut away to provide for the doorway. These are placed in the corners or angles of the interior of the safe, and are secured thereto by rivets or bolts, to be hereinafter described, in such manner as to completely break the joints throughout the entire inner surface of the safe. After they have been inserted in suitable number, other wall-plates are inserted, the first series of which correspond in vertical position to the side pieces, $g'$, and rear pieces, $g^2$, of the bracing and tying parts. A portion of the outer paneling-plates and the inner plates behind them is shown detached in Fig. 2, these plates ordinarily decreasing in thickness inwardly, the outer being about an inch in thickness, the next about three-quarters of an inch, and the remainder about one-half an inch. The inner plates are preferably secured to the outer in the following manner: H represents a bolt having a threaded portion, $h$, a conical portion, $h'$, a part, $h^2$, of the form of a frustum of a reverse cone, a squared portion, $h^3$, an elongated conical part, $h^4$, and a threaded part, $h^5$. After the second plate, I, has been placed in proper position against the paneling-plates, it is secured thereto by means of a suitable number of these bolts, said plate having a conical aperture for each bolt corresponding to the cone part $h'$, and the outer or panel plate being provided with a threaded aperture to receive the part $h$. The bolt is inserted through the plate I, and forced into the panel-plate by means of a wrench applied to the squared part $h^3$. The bolt-aperture in the panel-plate extends outward only to the outer layer or lamina of steel, and against this steel the bolt is driven. The steel (assisted by the layer of iron upon the outside) protects the bolt from being attacked by means of tools from the outside, even if the position of the bolt should be known. The next plate, I', is provided with a reverse conical aperture, which fits over the frustum $h^2$. This part $h^2$ of the bolt, however, may be dispensed with— that is to say, the conical part $h'$ may extend to the squared portion $h^3$; or a cylindrical or other shaped part may be substituted for that shown at $h^2$. So, too, as will be readily seen, the part $h^4$, if made conical, as shown, will perform the office of the conical part $h^2$—that is to say, it, in conjunction with the inner plates, will prevent a driving inward of the bolt. Of course these advantages—viz., the preventing of the bolt from being drawn outward or driven inward by means of the expanded part $h'$ and the inwardly-contracting part $h^4$ or $h^2$—may be attained without having the bolts squared or angular in cross-section. I prefer, however, to make them thus square or angular, as shown at $h^3$, as I thereby attain an additional advantage, as above said. Upon the plate I' are then placed others, as at I² I³ I⁴, of suitable number, those at I² and I³ being provided with squared or angular apertures adapted to fit the squared or angular shank parts $h^3$ of the bolts. When thus fitted to these parts, the inner plates lock the bolt properly in position and prevent it from being rotated until said inner plates have been again removed. After a sufficient number of the plates have been put in place, they are all properly clamped together by means of nuts, as at $h^6$, engaging with the threaded parts $h^5$ of the bolts. Instead of this nut-fastening at the inner ends, said ends may be riveted, as shown at $h^7$, Fig. 2, though I prefer the nut, from the fact that when used it permits the plates of the safe to be taken down from the inside, which it is sometimes desirable to do. Some of the nuts may be locked by providing square or angular apertures in the inner plate, adapted to fit over and engage with the nuts, whereby additional security is provided against having any of the parts loosened. The bolts are constructed of a composite material made up of layers of steel and iron, and after being rolled or otherwise compacted they are twisted, so as to have the layers or laminæ of steel cross all the longitudinal planes of the bolt, to prevent the drilling of the same longitudinally. The front stationary plates on one side are represented by $A' J' J^2 J^3 J^4 J^5$ and upon the other side by $A^3 j' j^2 j^3 j^4 j^5$. These may be joined to or abutted against the side plates above described in any suitable way, though, if desired, angle-plates may be used upon the inside at the front corners. The door is constructed of a corresponding series of plates, $K K' K^2 K^3 K^4 K^5$, secured together in the manner already described above for fastening the stationary wall-plate. A much better joint between the door and the jamb or casing can be produced if overlapping tongues L-shaped in cross-section can be provided, such as shown at $k^3$ and $k^x$. These are produced by rolling or otherwise shaping one or more of the front stationary plates to have angular outward projection, as at $k^3$, and shaping one of the plates (as at $K^2$) so as to have corresponding angular projections, $k^x$, extending inward. When the parts are thus constructed and the angular projections are caused to overlap, as shown in Fig. 1, it will be seen that it is practically impossible to swing the door on an axis, and therefore exceedingly difficult to cause by wedging or other similar action a movement of the door from either edge. Moreover, it is practically impossible to insert powder or other explosive material into the interior chamber of the safe, owing to the difficulty of getting such material around the overlapping projections. It will be seen, however, that the door cannot be opened, even when it is desired to do so, unless there be caused first an outward sliding of it in planes at right angles to the safe.

I combine with the door hinges of peculiar character, by which the door can be first drawn outwardly to disengage the L-shaped overlapping projections, and by which, afterward, it can be swung axially outward. Each of these hinges consists of two main parts or members, one having a barrel, L, and a plate, L', and the other of which has a corresponding barrel, M, and fastening-plate M', together with other detail parts, which will be presently described. The fastening-plates are held in place by means of bolts $N N' N^2$, the part N being screw-threaded, the part N' being conical, and the part $N^2$ being squared or angular in cross-section. The bolt is passed outwardly from the inside of one or more of the plates, there being a conical recess formed to receive it. The screw-thread projects beyond the outer face, and is inserted in one of the apertures, $l$ or $m$, in the fastening-plates. After being passed through its appropriate aperture, it is secured by means of the cylindrical nut marked $n$, which may be driven in by a screw-driver. It is practically impossible to gain access to the safe at the points where the hinges are attached, as the bolts are of such shape and inserted in such manner that they cannot be withdrawn outwardly and cannot be pushed inwardly. If they could be withdrawn outward, (as is the case with the hinge bolts or screws commonly used in hanging safe-doors,) apertures would be left, by means of which drills or other tools could be inserted for the purpose of forcing an opening. It will be seen that this purpose of the invention can be attained so long as the bolt has an outwardly-projecting portion adapted to be engaged with the hinge-plate, and at the same time is formed or provided with a key or stop, (preferably integral with the bolt,) which engages with the safe-wall, to prevent its being pulled outwardly. Of course there are modifications in these respects which will readily suggest themselves to those skilled in this art. The same may be said of the pieces carried by the bolt, which are square or angular in cross-section, and which engage with one or more of the plates in the safe-wall, to prevent the rotation of the bolt. The bolts being made in the manner above described—that is to say, of alternate layers or laminæ of iron and steel twisted—it is exceedingly difficult to bore longitudinally through them, so that the hinge-plates can be secured in this way with an assurance that the means of fastening shall not offer any opportunity for improper entrance to the safe. The barrel L of the lower hinge-plate is provided with a central cylindrical screw-threaded aperture. This receives the pintle O, which has a squared end, $o$, a threaded shank, $o'$, a conical part, $o^2$, and a bearing or pivotal part, $o^3$. The screw-threaded part is inserted into the screw-threaded aperture in the barrel L, it being passed up until the bottom of the conical part $o^2$ is at or near the bottom of the barrel M, which is situated around it, as will be set forth. After the pintle has been inserted into proper position, it is locked there by means of a jam-nut, O'. The square end $o$ allows the application of a wrench to force the pintle upward.

The barrel M is supported above the barrel L by means of an interposed collar, P. This collar is provided with inclined faces $p\ p$, corresponding to similarly-shaped faces $l'$ upon the upper end of the lower barrel, L. The upper face of the collar is smooth, and upon this rests the lower end of the barrel M. $p'\ p'$ are apertures to permit the engagement of a wrench with the collar, though the circumference may be made angular, whereby an angular wrench can be applied. This construction of parts enables me to accurately adjust the vertical position of the doors, and after wear has occurred it can be compensated by adjusting the collar P upon the barrel L. $p^2$ is a set-screw, by which the collar P can be securely locked in any desired position.

It will be seen that the adjusting device which I employ is interposed between the two hinge members in such way as to bear directly against them entirely independent of the pivot, pintle, or axial connecting device which joins the two hinge members together. Therefore the pintle or pivot can be adjusted to take up wear, regardless of the adjusting device which raises or lowers one of the hinge members, and vice versa. To permit of this independent support and operation of the adjusting device, I arrange the lock-nut or jam-nut below the lower hinge member, so that it can be reached and operated without in any wise affecting the cam-ring or wedge-ring which is interposed between the two hinge members. By employing the box Q around the upwardly-projecting portion of the pintle, I remove from the latter all the strain and wear which would be experienced if the pintle received directly the thrust of the lever, and, moreover, provide a ready means for taking up the wear which may occur.

The upper barrel, M, carried by the door, is provided with a longitudinal aperture which is elongated in cross-section. Within this aperture there is placed a box or journal-piece, Q, fitted tightly to the walls of the aperture, and provided with a central longitudinal opening, $q$, through which the part $o^3$ of the pintle O can be passed at the bottom. The aperture $q$ is flared somewhat, to correspond to the conical portion $o^2$ of the pintle. The barrel M and plate M' are cast with a projection, M², in the form of a rib, web, or flange, and through this there is formed an aperture extending from the outside to the central inner aperture. In the horizontal aperture there is mounted a lever, R, having an expanded bearing or fulcrum part, $r$, preferably of a diameter equal to that of the aperture in which it is mounted, so that the lever can get a bearing by means of it against the walls of the aperture. At the inner end of the lever there is a notch or recess, as at $r'$, fitted around the box or bearing-piece Q, the latter being preferably cut away or recessed at about the center vertically, so as to provide a cylindrical or curved bearing for the end of the lever.

$r^2$ is a pin passing downward through the part $r$ of the lever R. This pin, however, does not operate as a fulcrum for the lever, but acts simply to prevent longitudinal movement, the fulcrum being provided, as above said, by one side or the other of the wall of the aperture in which the lever is mounted. It will be seen that if the outer end of lever R be drawn away from the plane of the front of the safe, it will by bearing against the box Q compel the door to move outward on lines at right angles to the front of the safe; and, on the other hand, if the outer end of the lever be moved inward, the door will be moved in a similar direction. The limit of play of these parts should be such as to correspond to the overlapping projections $k^3$ and $k^8$, so that they can be disengaged before the door moves around the pintles axially. As soon as the end of the lever R has been thrown out, the door will have moved out on straight lines far enough to permit the axial movement. If it be desired, the lever R can be withdrawn, as the pin $r^2$ can be detachable, and when so withdrawn an additional safeguard is provided to prevent improper access to the safe.

Both the upper and the lower hinges can be made in the way described, and the swinging levers can be joined by a vertical rod, R', whereby they can be operated simultaneously.

I do not herein claim the devices for fastening the door-hinge to the outside of the safe, but reserve to myself the right to claim all novel features pertaining thereto in another application.

Figures 13, 17:
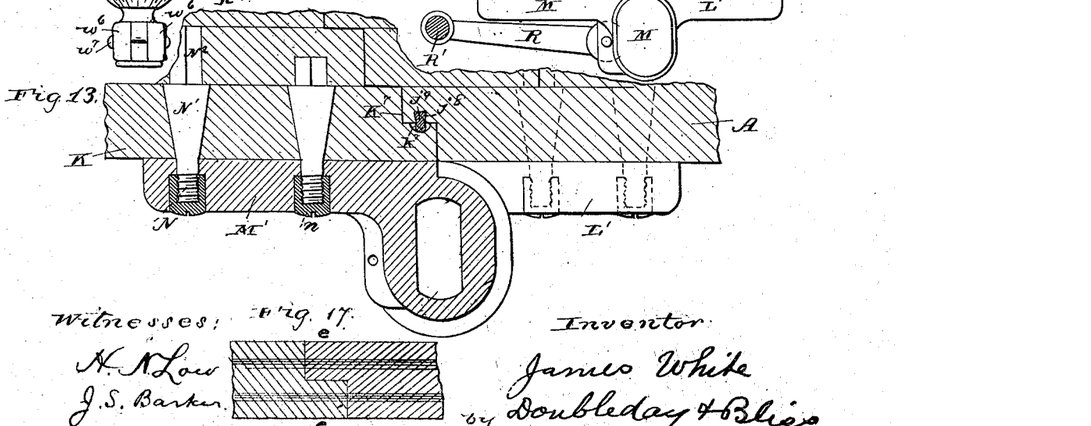
Fig. 13 is a section showing the method of fastening the hinge to the safe.
Fig. 17 shows the now usual method of joining the outer plates of safes.

In the rabbeted part of the stationary plates there are formed dovetailed grooves at $j^7$, and in the rabbeted part of the door there are formed also grooves, as at $k^7$. (See Fig. 13.) $j^9$ represents a strip of felt or other equivalent material, one edge of which is firmly secured within the dovetailed groove, the other edge being so situated as to enter the groove $k^7$ when the door is closed. The last-said groove is somewhat wider than the thickness of the felt, so that the latter shall have room to bend in the groove, and when thus arranged it increases the difficulty of inserting powder or other explosive materials. Sometimes such explosives are forced into safes by means of air-pumps; but when the felt lining is arranged as described, the felt operates to close the joints still more tightly, as it can bend in either direction to fit closely against the joint.

Figures 2, 15, 16:
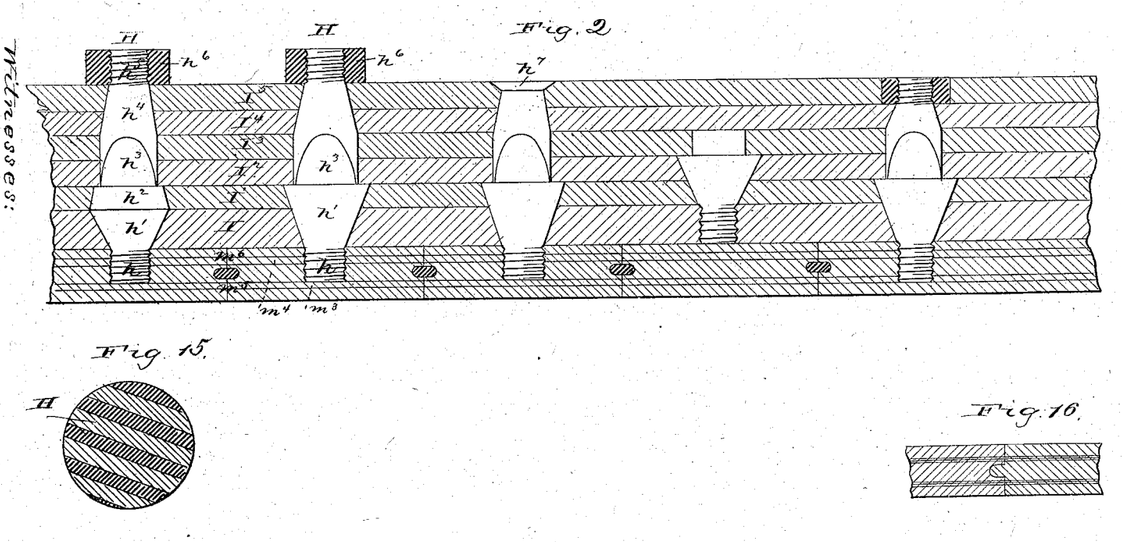
Fig. 2 is an enlarged view of a portion of the same.
Fig. 15 is a section of one of the twisted bolts.
Fig. 16 shows a modified form of the joint between the edges of the plates.
Figure 3:
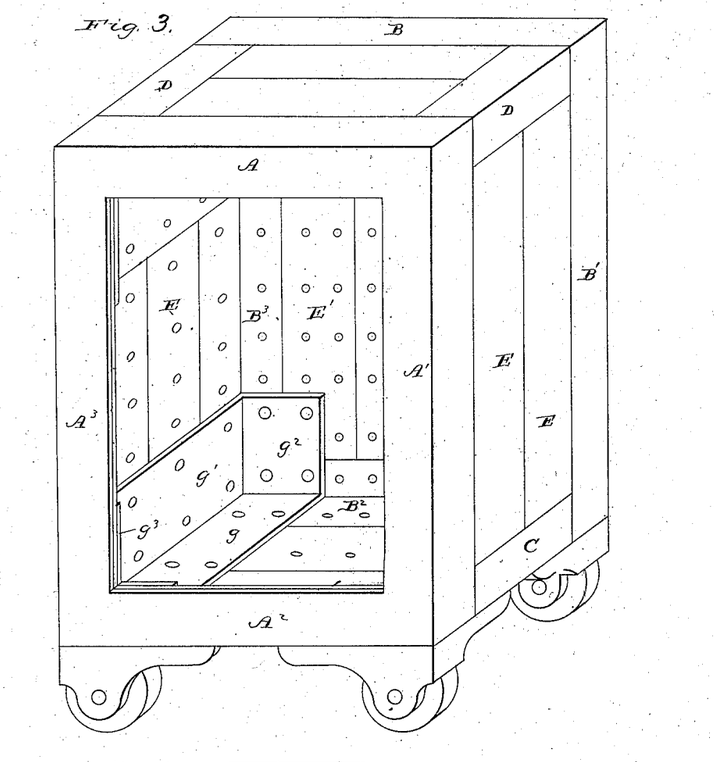
Fig. 3 is a perspective view of the outer parts of the safe before the inner plates have been inserted.
Figure 14:
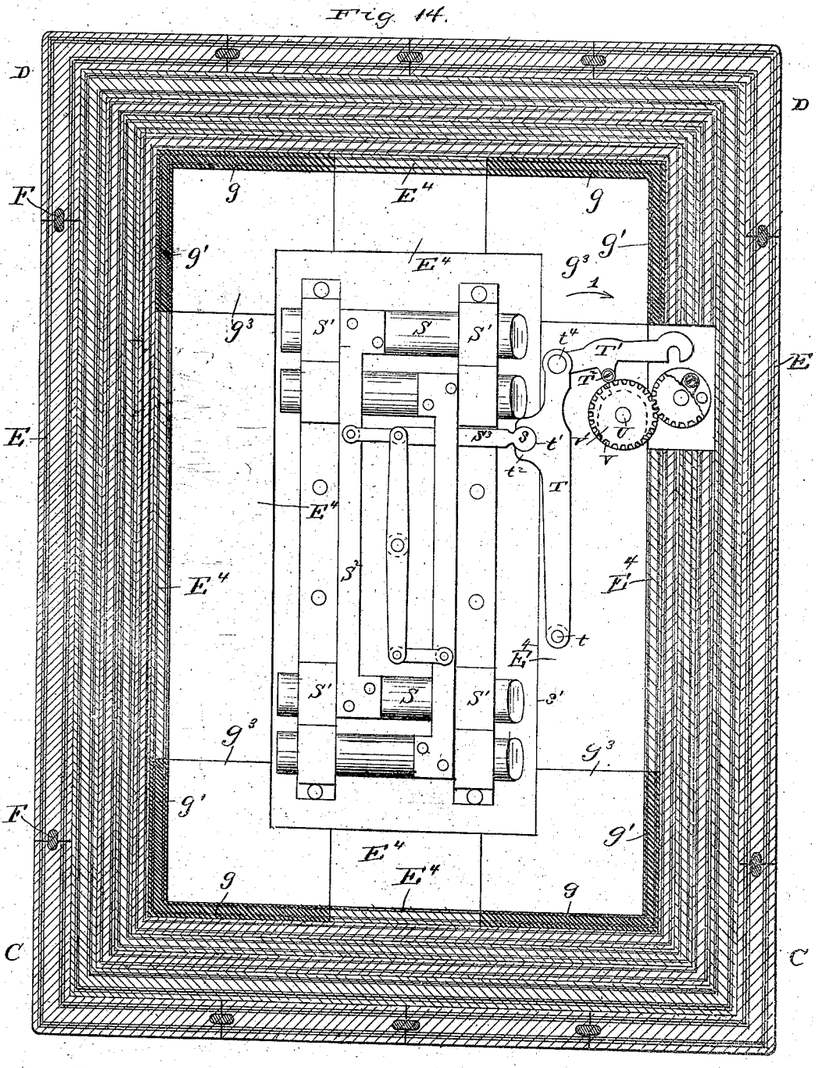
Fig. 14 is a vertical cross-section of the safe, showing the door from the inside.

In Fig. 16 there is shown a joint between the edges of the outer plates, produced by forming a tongue on one plate and an opposite groove in the other, the tongue and groove being in this case also at the central line of the edge. This joint, like that above described, is more effective in preventing wedging than the ordinary one shown in Fig. 17; but I prefer that shown in Figs. 1 and 14, as the parts can be planed or ground much more truly than when tongues are formed on the edges.

I do not in this case claim the novel features pertaining to the bolt-work; but reserve to myself the right to claim all matters pertaining thereto in another application which I am about to file as a division of this case.

What I claim is—

1. In a safe, a metallic plate constructed with a groove, $c'$, adapted to receive a dowel or the tongue of an opposing plate, and having a layer of steel, $m^2$, outside of said groove, and a layer of softer metal outside of said steel layer, said steel layer being adapted, substantially as set forth, to prevent the cutting away of that portion of the metal lying outside of the groove, substantially as set forth.

2. In a safe, a composite metallic sheet or plate having a central softer iron layer and alternate layers of steel and softer iron, and having a groove formed in the central layer of softer iron, the edges of the steel layers being arranged, substantially as set forth, to protect both sides of the groove.

3. In a safe, the combination, with an outer metallic sheet and sheets inside thereof, of a bolt having the threaded part $h$, the flaring or expanded part $h'$, and the part $h^2$, angular in cross-section, whereby it can be caused to engage with one of the metallic sheets to prevent its rotating, substantially as set forth.

4. The combination, with the outer metallic sheets and the inner sheets, of a bolt having a screw-threaded part, $h$, the conical or flaring part $h'$, the part $h^2$, angular in cross-section, and the threaded part $h^3$, adapted to receive a nut, substantially as set forth.

5. The combination, with the outer metallic sheet and the inner sheets, of a bolt having the threaded part $h$, the conical or expanded part $h'$, which prevents the drawing of the bolt outward, and a reverse cone or inwardly-contracting part adapted to engage with a corresponding aperture in an inner sheet of the wall, to prevent the forcing of the bolt inward.

6. In a safe, the combination, with an exterior metallic sheet formed of layers of steel and layers of softer iron rolled together, and provided with threaded apertures extending from the inner surface of said sheet to the outer layer of steel, of a bolt having a screw-threaded portion, $h$, adapted to be forced into proximity to said layer of steel, and having inside thereof the expanded portion $h'$, adapted to engage with inside sheets of metal, to prevent the withdrawal of the screw, substantially as set forth.

7. The combination of the hinge member L L', the hinge member M M', provided with a slot or aperture, the pintle or pivot rigidly secured to the hinge member L L' by a screw-thread, and having its upper end situated in said slot or aperture in the hinge member M M', the jam-nut below the member L L', and the non-sliding but rotary box Q, supported upon the hinge member L L' above the screw-thread, substantially as set forth.

8. The combination of the hinge member L L', the hinge member M M', the pivot or pintle stationarily secured to the hinge member L L' and projecting into the other member, M M', and formed with the vertically-adjustable conical portion $o^3$, and the box Q, interposed between the pivot or pintle and the sliding hinge member, and provided with a concave conical recess adapted to fit the conical portion of the pivot or pintle, substantially as set forth.

9. The combination of the hinge member fastened to the safe, the hinge member fastened to the door, the pivot or axial connecting device which joins the two hinge members, and the interposed cam-plate or wedge-plate, which rests upon the lower hinge member independently of the pivot or axial connecting device and bears against the upper hinge member, and means for securing said plate after the hinge has been adjusted, substantially as set forth.

10. The combination of the hinge member fastened to the safe, the hinge member fastened to the door, the pivot or axial connecting device which joins the two hinge parts, the adjusting device interposed between the two hinge members, the vertically-adjustable pivot or axial connecting device which joins the two hinge members, and the lock-nut or jam-nut below the lower hinge member, for securing the pivot or axial connecting device in proper position vertically, substantially as set forth.

11. The combination of the hinge member fastened to the safe, the hinge member fastened to the door, one of said hinge members being provided with a cam-face or wedge-face, $j'$, and the interposed adjusting device having a corresponding cam-face or wedge-face, substantially as set forth.

12. The combination of the hinge member fastened to the safe, the hinge member fastened to the door, one of said hinge members carrying a cam or wedge, as at $j'$, the pivot or axial connecting device which joins the two hinge members, and the interposed ring carrying cams or wedges, and means for securing it in place after adjustment, substantially as set forth.

13. The combination of the two hinge members, one of which is provided with a slot, the pintle or axial connecting device, a portion of which is situated in said slot, the box Q, interposed between said pintle and the wall of the slot, and the lever R, which engages with said box, substantially as set forth.

14. The combination of the non-sliding hinge member, the sliding hinge member provided with a slotted barrel, M, and with an aperture in the side of the barrel, the pintle or axial connecting device which joins the hinge members together, the box Q, and the lever R, provided with a forked or open-ended recess, by means of which it can have engagement with the box, and pivoted to the sliding hinge member, whereby it can be carried by the door while swinging, substantially as set forth.

15. The frame-work consisting of the front angle-piece, A A' A² A³, the inwardly-projecting plates of which are provided with the grooves $c'$, the rear angle-piece, B B' B² B³, whose inner plates have similar grooves, the top and bottom connecting angle-pieces, C D, provided at their inner edges with similar grooves, the side plates, E E, the back plates, E' E', and the steel connecting pieces or devices F, arranged substantially as set forth.

16. The combination, with the outer wall or panel, of the upper angular bracing or tying pieces and the lower similar bracing or tying pieces, each having a bottom, $g$, side pieces, $g'$, and bracing end pieces, $g^2$, and the supplemental panel-pieces $E^4$, situated between the upper and lower side pieces, $g'$ and $g^2$, and between the right and left bottom pieces, $g$, substantially as set forth.

In testimony whereof I affix my signature in presence of two witnesses.

JAMES WHITE.

Witnesses:
DANIEL GOTWALL,
WM. D. ELLIOT.